United States Patent
Gehring et al.

(10) Patent No.: US 9,725,086 B2
(45) Date of Patent: Aug. 8, 2017

(54) METHOD FOR OPTIMIZING A POWER REQUIREMENT OF A MOTOR VEHICLE

(75) Inventors: Ottmar Gehring, Kernen (DE); Felix Kauffmann, Stuttgart (DE); Daniel Nullmeier, Waiblingen (DE); Juergen Elser, Auenwald (DE)

(73) Assignee: Daimler AG, Stuttgart (DE)

( * ) Notice: Subject to any disclaimer, the term of this patent is extended or adjusted under 35 U.S.C. 154(b) by 270 days.

(21) Appl. No.: 14/117,162

(22) PCT Filed: Dec. 10, 2011

(86) PCT No.: PCT/EP2011/006245
§ 371 (c)(1),
(2), (4) Date: Nov. 13, 2014

(87) PCT Pub. No.: WO2012/155940
PCT Pub. Date: Nov. 22, 2012

(65) Prior Publication Data
US 2015/0066236 A1 Mar. 5, 2015

(30) Foreign Application Priority Data
May 13, 2011 (DE) .......................... 10 2011 101 395

(51) Int. Cl.
*G05D 1/00* (2006.01)
*G05D 3/00* (2006.01)
(Continued)

(52) U.S. Cl.
CPC ............. *B60W 30/00* (2013.01); *F01P 7/167* (2013.01); *G01C 21/3469* (2013.01)

(58) Field of Classification Search
CPC ...... F01P 7/167; G01C 21/3469; B60W 30/00
(Continued)

(56) References Cited

U.S. PATENT DOCUMENTS 5,924,406 A 7/1999 Kinugasa et al.
8,972,161 B1 * 3/2015 Koebler ............. G01C 21/3469
340/995.27
(Continued)

FOREIGN PATENT DOCUMENTS

DE 10 2009 039 374 A1 3/2011
JP 9-324665 A 12/1997
(Continued)

OTHER PUBLICATIONS

International Search Report dated Jun. 13, 2012 with English translation (four (4) pages).
(Continued)

*Primary Examiner* — Calvin Cheung
*Assistant Examiner* — Paula L Schneider
(74) *Attorney, Agent, or Firm* — Crowell & Moring LLP

(57) ABSTRACT

A method for optimizing a power requirement of a motor vehicle that includes a speed control system for a drive unit and a temperature control system for a cooling circuit of the drive unit. A first power requirement of the drive unit to be expected and a second power requirement of the cooling circuit to be expected are determined based on at least one route parameter. A driving strategy corresponding to the route parameter is initially selected, and the first power requirement corresponding to the driving strategy and the second power requirement corresponding to the driving strategy are determined. Based on the determined first and second power requirements, the driving strategy is then adjusted in such a way that an overall power requirement of the motor vehicle is minimized.

4 Claims, 1 Drawing Sheet

(51) Int. Cl.
    *G06F 7/00*           (2006.01)
    *G06F 17/00*         (2006.01)
    *B60W 30/00*       (2006.01)
    *F01P 7/16*           (2006.01)
    *G01C 21/34*        (2006.01)

(58) Field of Classification Search
    USPC .......................................................... 701/1
    See application file for complete search history.

(56) References Cited

U.S. PATENT DOCUMENTS

| | | | |
|---|---|---|---|
| 2006/0185626 A1* | 8/2006 | Allen | F01P 7/048 |
| | | | 123/41.12 |
| 2007/0112475 A1 | 5/2007 | Koebler et al. | |
| 2007/0261648 A1 | 11/2007 | Reckels et al. | |
| 2011/0313647 A1* | 12/2011 | Koebler | B60L 15/2045 |
| | | | 701/123 |
| 2014/0149006 A1* | 5/2014 | Eriksson | F01P 7/165 |
| | | | 701/54 |

FOREIGN PATENT DOCUMENTS

| | | |
|---|---|---|
| JP | 2004-324613 A | 11/2004 |
| JP | 2010-96042 A | 4/2010 |

OTHER PUBLICATIONS

German-language Written Opinion (PCT/ISA/237) dated Jun. 13, 2012 (six (6) pages).
Japanese Notification of Reason for Refusal dated Jan. 6, 2015 with English-language translation (seven (7) pages).

\* cited by examiner

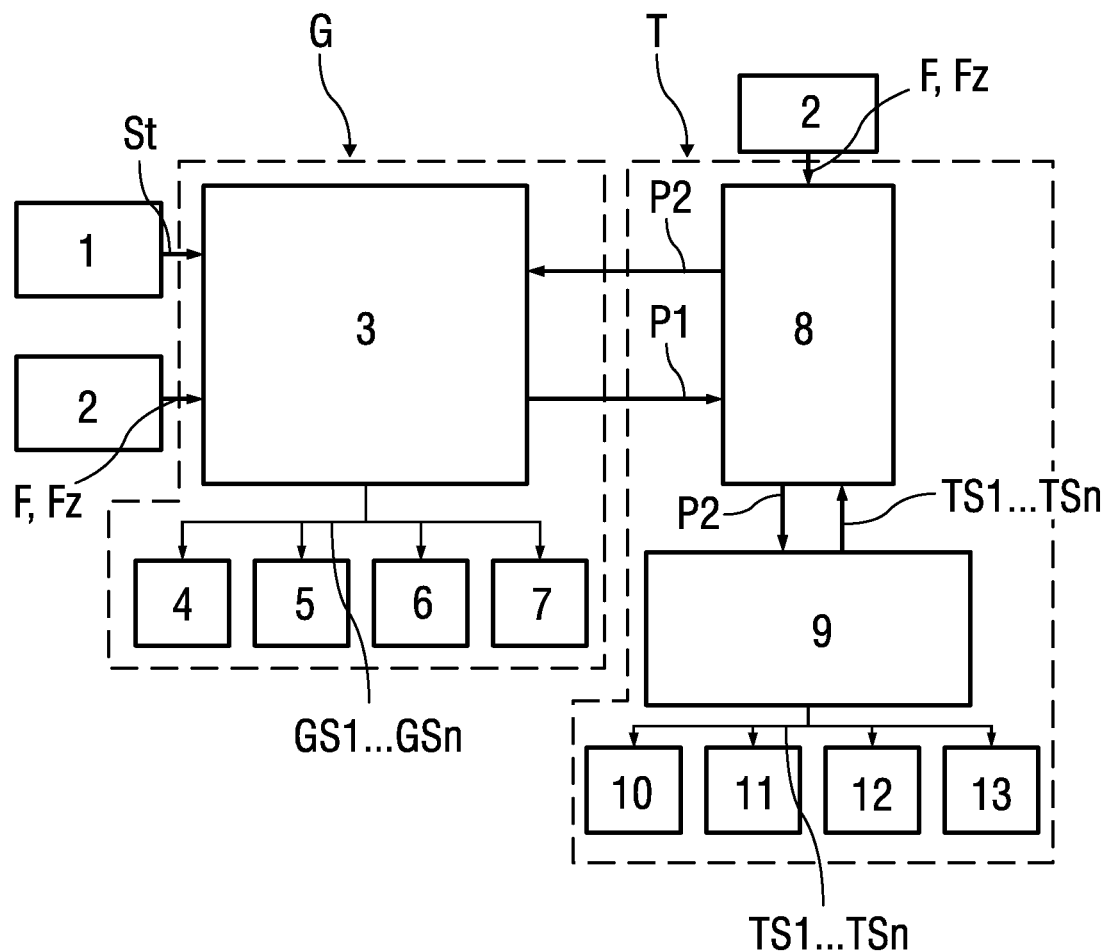

METHOD FOR OPTIMIZING A POWER REQUIREMENT OF A MOTOR VEHICLE

BACKGROUND AND SUMMARY OF THE INVENTION

Exemplary embodiments of the present invention relate to a method for optimizing a power requirement of a motor vehicle, and a device for carrying out the method for optimizing the power requirement.

Known predictive temperature control systems for motor vehicles allow implementation of a predictive control strategy for controlling the temperature of the drive unit of the motor vehicle.

In the methods of the prior art, a future heat input, in particular of an internal combustion engine, is predictively computed with the aid of digital maps and position location of the motor vehicle, which may be carried out in particular by means of Global Positioning System (GPS) position finding, and early control intervention is performed in order to reduce the energy consumption and/or fuel consumption of the motor vehicle.

U.S. Patent document US 2007/0261648 A1 discloses a method for operating a temperature control system in which a future heat input is estimated from the expected route of the motor vehicle. In particular, an elevation profile of the expected route is taken into account, so that an additional high heat input occurring during uphill travel or a low heat input during downhill travel may be determined in advance. The temperature control system may thus be coordinated with the elevation profile. In particular, a high temperature may be temporarily accepted when, for example, extended downhill travel lies ahead. Unnecessary control interventions for regulating the temperature are thus avoided, thereby reducing the energy consumption and fuel consumption.

Exemplary embodiments of the present invention provide a method for optimizing a power requirement of a motor vehicle which is improved over the prior art.

In a method for optimizing a power requirement of a motor vehicle, which includes a speed control system for a drive unit and a temperature control system for a cooling circuit of the drive unit, a first power requirement of the drive unit to be expected and a second power requirement of the cooling circuit to be expected are determined based on at least one route parameter. According to the invention, a driving strategy corresponding to the route parameter is initially selected, and the first power requirement corresponding to the driving strategy and the second power requirement corresponding to the driving strategy are determined. Based on the determined first and second power requirements, the driving strategy is then adjusted in such a way that an overall power requirement of the motor vehicle is minimized.

The first power requirement that is to be expected for a selected driving strategy may be determined by computations based on various methods, or also by estimation as a function of certain parameters. Regardless of the way in which the first power requirement is determined, the second power requirement of the cooling circuit to be expected may also be determined by computations based on various methods, or by estimation as a function of certain parameters.

The method is used for reducing the overall power requirement of the motor vehicle. To this end, the temperature control system and the speed control system are coupled to one another, and may be regarded as a unit. Thus, in particular a slightly greater power requirement of the drive unit may be accepted when it is offset by a correspondingly lower second power requirement of the cooling circuit.

In addition, the method for optimizing the power requirement allows early, energy-efficient control of the temperature control system of the motor vehicle. Thus, in particular it may be recognized whether or not required temperature limits may be met despite predictive intervention, or only with significant energy consumption. The temperature control system is in bidirectional communication with the speed control system of the motor vehicle, so that in such cases the driving strategy of the motor vehicle may be adjusted. For example, the driving strategy is adjusted in such a way that a high heat input, which results in a high second power requirement of the cooling circuit, is reduced early. This may be achieved, for example, by appropriate control interventions in a transmission unit of the motor vehicle.

The driving strategy is preferably adjusted when an expected heat input for the drive unit exceeds a critical value.

The method for optimizing a power requirement is likewise suited for motor vehicles having an internal combustion engine, an electric motor, or a hybrid drive, and may also be combined with systems for heat recovery which supply further heat input to the cooling system.

Unnecessary control interventions in the cooling circuit are advantageously avoided, thus prolonging the service life of the corresponding components of the cooling circuit.

BRIEF DESCRIPTION OF THE DRAWING FIGURE

Exemplary embodiments of the invention are explained in greater detail below with reference to one drawing, which shows the following:

FIG. 1 schematically shows a design of a device for optimizing a motor vehicle.

Mutually corresponding parts are provided with the same reference numerals in the FIGURE.

DETAILED DESCRIPTION

FIG. 1 schematically illustrates a method for optimizing a power requirement of a motor vehicle, and a device which is suitable for carrying out the method.

A predictive module 1 supplies data by means of which position location of the motor vehicle is carried out. The predictive module 1 includes, for example, a receiver for satellite-based position finding signals such as Global Positioning System (GPS) data in particular. Alternatively, the present position of the motor vehicle may also be determined by means of classical navigation functions. In addition, an appropriate input device of a navigation unit may be provided, so that a vehicle driver may specify the origin position of the motor vehicle and/or one or more desired destination position(s) of the motor vehicle. The predictive module 1 may also have a surroundings sensor system, such as vehicle interval radar in particular, which detects the surroundings of the motor vehicle.

The predictive module 1 includes a digital street map that provides three-dimensional map data. Route parameters St characterizing a route segment ahead of the motor vehicle are determined from the three-dimensional map data. Elevation data, route courses, and/or speed limits for route segments that are evaluated for determining the route parameter St are stored in the predictive module 1. In particular gradient data or curve data for the roadway, as well as a traffic volume to be expected on the route, may be determined as route parameters St.

The route segment to be characterized may be preset by specifying the origin and destination positions. Alternatively, a route segment of a projected horizon may be selected by computing the most likely path. For this purpose, instantaneous driving parameters F, such as an instantaneous position, the driving direction, and/or the speed of the motor vehicle in particular, are evaluated.

An operating data module 2 detects all instantaneously relevant driving parameters F and vehicle parameters Fz of the motor vehicle. In particular, present control interventions by the vehicle driver (for example, depressing an accelerator pedal), engine and transmission data (for example, the instantaneous actual gear of a transmission unit, temperatures of a drive unit and/or of a coolant), and driving data (for example, speed and/or acceleration of the motor vehicle) are detected as driving parameters F and vehicle parameters Fz.

A driving strategy module 3 of a speed control system G of the motor vehicle computes a predictive driving strategy for the upcoming route segment in such a way that a first power requirement of the drive unit is optimized. Based on the route parameters St, a consumption-optimized default for predicted first parameters P1 is determined, which includes in particular the power demands on a temperature control system T of a cooling circuit for the drive unit which are required for implementing the driving strategy.

Various actuator units 4, 5, 6, 7 of the motor vehicle are controlled by means of appropriate speed adjusting parameters GS1 through GSn for implementing the driving strategy. For example, a gear selection of the automatic transmission unit and a torque control of the drive unit, which may include an internal combustion engine or an electric motor, are controlled according to the driving strategy. In addition, in particular the actuation of one or more sustained-action brakes (retarders, for example) of the motor vehicle is regulated by means of the speed adjusting parameters GS1 through GSn. The electric motor and sustained-action brake function as additional heat sources for the temperature control. The torque control may be implemented as part of an automated cruise control operation.

The speed control system G includes actuator units 4, 5, 6, 7 for regulating the speed of the motor vehicle. A gear selection module 4 coordinates the gear selection according to the predictive driving strategy, determined by the driving strategy module 3, with the transmission unit. In particular, an operating function of the automated manual transmission unit or of the automatic transmission of the motor vehicle is regulated by means of the speed adjusting parameters GS1 through GSn for implementing the consumption-optimized driving strategy.

In addition, the speed control system G includes at least one torque specification module 5 for the internal combustion engine or a torque specification module 6 for the electric motor. The method for optimizing the power requirement of the motor vehicle is particularly suited for a hybrid vehicle in which the drive unit has an internal combustion engine as well as an electric motor. The torque specification module 5, 6 correspondingly controls the overall torque path of the drive unit of the motor vehicle according to the specified speed adjusting parameters GS1 through GSn.

For optimizing the energy consumption or fuel consumption of a utility vehicle such as a truck, for example, a torque specification module 7 for controlling sustained-action brakes (retarders, for example) is provided. The sustained-action brake may be designed, for example, as an electrodynamic retarder in which the motor vehicle is decelerated by means of induced eddy currents, or as a hydrodynamic retarder in which the energy necessary for decelerating the motor vehicle is thermally supplied to a brake fluid. Such sustained-action brakes are used for reducing the risk of overheating of a normal braking unit of the motor vehicle during extended downhill travel. The sustained-action brake is controlled for energy-efficient utilization of the motor vehicle by means of the speed adjusting parameters GS1 through GSn. In particular, the sustained-action brake may also be used for supplying additional heat to a cooling circuit of the motor vehicle.

In particular, a braking function or sustained-braking function for the electric motor may also be provided via the torque specification module 6, whereby the electric motor in generator mode recuperates driving energy and supplies same in the form of electrical energy to an energy store.

The temperature control system T of the motor vehicle has a temperature prediction module 8 that computes in advance a heat input acting on the motor vehicle based on the predicted first parameters P1. Appropriate mathematical or numerical models are used for this purpose. In particular, the heat input from the internal combustion engine, the electric motor, the sustained-action brake, or other components of the motor vehicle that are connected to the cooling circuit is determined. Future downhill travel is identified as heat sinks based on the upcoming route segment and the associated route parameters. The result is the predicted temperature curve over the projected horizon and corresponding predicted second parameters P2, on the basis of which a control strategy for controlling the temperature curve is implemented.

An evaluation unit 9 determines the control strategy based on the predicted temperature curves and the second predicted parameters P2. The control strategy for the control interventions by the temperature control system T are determined in such a way that the cooling function manages with the lowest possible additional second energy consumption or fuel consumption and actuator activity. Associated temperature adjusting signals TS1 through TSn for controlling the temperature control system T are computed in advance. The temperature adjusting signals TS1 through TSn regulate the temperature of the drive unit, for example, in such a way that the temperature of a coolant is supercooled prior to an expected higher heat input, so that, making use of a thermal buffer of the drive train units, the connection of additional actuator units 10, 11, 12, 13 for controlling the temperature, which may have a high power requirement, is avoided. In addition, the actuator units 10, 11, 12, 13 may be actuated in a more targeted manner, since a distinction may be made between brief adaptive braking and sustained-action braking on a descending slope.

A plurality of actuator units 10, 11, 12, 13 of the temperature control system is controlled by means of the temperature adjusting signals TS1 through TSn. Thus, for example, the delivery capacity of a pump unit 10 of the cooling circuit is regulated in order to implement the predicted temperature curve. The delivery capacity of the pump unit 10 may be adjustable in a stepless or stepped manner.

A thermostatic valve 11 that is adjustable in a stepless or stepped manner is regulated by means of the temperature adjusting signals TS1 through TSn in such a way that a mixing ratio of cooled coolant from a coolant cooler to uncooled coolant from a small second cooling circuit that has no coolant cooler is adjusted for regulating the heat input.

Furthermore, for regulating the temperature, an actuator unit of an air supply control system 12 is controlled by means of the temperature adjusting signals TS1 through TSn. Thus, for example, a fan louver, a fan damper, or a fan roller for regulating a cooling air flow may be opened and closed or brought into an intermediate position which is appropriate for cooling the engine temperature.

A fan 13 is switched on and off by means of the temperature adjusting signals TS1 through TSn for regulating the heat input. A rotational speed of the fan 13 may also optionally be regulated to ensure optimal cooling of the drive unit.

The predicted second parameters P2 determined by the temperature prediction module 8, which in particular contain information concerning the predicted temperature curve, may also be sent back to the driving strategy module 3 of the speed control system G. The corresponding signal flow thus has feedback from the temperature control system T to the speed control system G. An intervention in the driving strategy for relieving the temperature control system T and its actuator units 10, 11, 12, 13 is thus made possible. In particular, the driving strategy may be adjusted when the actuator activity of the temperature control system T is too high or the second power requirement of the cooling circuit exceeds a predefinable limit value. The feedback from the driving strategy module 3 thus allows an adjustment of the driving strategy in such a way that an overall power requirement comprising the first power requirement of the drive unit and the second power requirement of the cooling circuit is minimized.

Similarly, the signal flow between the evaluation unit 9 and the temperature prediction module 8 is also fed back. The temperature adjusting signals TS1 through TSn, which contain the power demands such as rotational speed and torque demands, are sent back to the temperature prediction module 8 so that these variables may be taken into account for predicting a future temperature curve. An optimization process or a heuristic control strategy which requires advance computation by the temperature prediction module 8 for determining the temperature adjusting signals TS1 through TSn may thus be implemented.

The operating data module 2 provides the vehicle parameters and driving parameter Fz, F, respectively, to the driving strategy module 3 of the speed control system G and also to the temperature prediction module 8 of the temperature control system T. In particular, driving interventions by the vehicle driver may thus be incorporated into the predicted driving strategy and/or the predicted temperature curve.

The temperature control system T is connected to the speed control system G by means of a bidirectional interface so that data may be exchanged in both directions. This allows the driving strategy to be adapted to an excessively high second power requirement of the temperature control system T, thus minimizing the overall power requirement of the motor vehicle.

Thus, for optimizing the power requirement of the motor vehicle, a driving strategy which corresponds to the route parameter St may initially be selected. In particular, for an upcoming steep ascending roadway, the predictive driving strategy could select an optimum for an engine operating point so that the first power requirement is low and is favorable in terms of drive energy, but which requires a very intense heat input into the temperature control system T. If a future great requirement for cooling power is now expected by the temperature prediction module 8 despite possibly adjusted precooling, the temperature control system T reports the corresponding second power requirement of the cooling circuit back to the speed control system G. Such feedback occurs when an expected cooling power, which includes the delivery capacity of the pump unit 10, for example, exceeds a critical value. The driving strategy module 3 now determines a new operating point for the drive unit of the motor vehicle that is favorable in terms of overall energy, with inclusion of the expected second power requirement of the cooling circuit in the computation. In this regard, either the same operating point may once again be determined, if this operating point already corresponds to the optimum of the overall power requirement despite high cooling power, or an operating point which is more unfavorable in terms of drive energy and which is selected with a corresponding higher first power requirement may be selected in which a corresponding heat input is reduced. A lower cooling power of the cooling circuit is thus necessary, and the second power requirement is reduced in such a way that the overall energy balance is minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Predictive module
2 Operating data module
3 Driving strategy module
4 Gear selection module
5 Torque specification module for an internal combustion engine
6 Torque specification module for an electric motor
7 Torque specification module for a sustained-action brake
8 Temperature prediction module
9 Evaluation unit
10 Pump unit
11 Thermostatic valve
12 Air supply control system
13 Fan
F Driving parameter
Fz Vehicle parameter
G Speed control system
GS1-GSn Speed adjusting parameter
P1 First parameter
P2 Second parameter
St Route parameter
T Temperature control system
TS1-TSn Temperature actuating signals

The invention claimed is:

1. A method for optimizing an overall power requirement of a motor vehicle, which includes a speed control system for a drive unit and a temperature control system for a cooling circuit of the drive unit, wherein the overall power requirement to be optimized includes a first power requirement of the drive unit and a second power requirement of the cooling circuit, the method comprising:
   selecting a driving strategy corresponding to a route parameter such that an optimum first power requirement of the drive unit corresponding to the driving strategy is determined;
   determining the second power requirement of the cooling circuit corresponding to the driving strategy;

feeding back the determined second power requirement of the cooling circuit to the speed control system for the drive unit by the temperature control system;

determining whether or not the driving strategy should be changed by the speed control system of the drive unit in order to adjust the optimum first power requirement of the drive unit based on the fed-back determined second power requirement of the cooling circuit such that the overall power requirement of the motor vehicle is minimized; and controlling actuators to implement the driving strategy in the motor vehicle.

2. The method according to claim 1, wherein the route parameter is determined from map data of a digital street map.

3. The method according to claim 1, wherein the temperature control system controls, using temperature adjusting signals, a control intervention in at least one pump unit, thermostatic valve, air supply control system, or fan.

4. The method according to claim 1, wherein the speed control system controls, using speed adjusting signals, a control intervention in at least one gear selection module, torque specification module for an internal combustion engine, torque specification module for an electric motor, or torque specification module for a sustained-action brake.

* * * * *